US009589056B2

(12) United States Patent
Wang et al.

(10) Patent No.: US 9,589,056 B2
(45) Date of Patent: Mar. 7, 2017

(54) USER INFORMATION NEEDS BASED DATA SELECTION

(75) Inventors: Taifeng Wang, Beijing (CN); Tie-Yan Liu, Beijing (CN); Xiaodong Fan, Sammamish, WA (US)

(73) Assignee: Microsoft Technology Licensing LLC, Redmond, WA (US)

(*) Notice: Subject to any disclaimer, the term of this patent is extended or adjusted under 35 U.S.C. 154(b) by 0 days.

(21) Appl. No.: 13/080,510

(22) Filed: Apr. 5, 2011

(65) Prior Publication Data

US 2012/0259831 A1 Oct. 11, 2012

(51) Int. Cl.
G06F 17/30 (2006.01)

(52) U.S. Cl.
CPC .... G06F 17/30867 (2013.01); *G06F 17/3089* (2013.01); *G06F 17/30312* (2013.01)

(58) Field of Classification Search
CPC ......... G06F 17/30867; G06F 17/30312; G06F 17/3089
See application file for complete search history.

(56) References Cited

U.S. PATENT DOCUMENTS

| 7,630,976 | B2* | 12/2009 | Zhang et al. | |
|---|---|---|---|---|
| 8,090,717 | B1* | 1/2012 | Bharat | G06F 17/3071 707/731 |
| 8,255,386 | B1* | 8/2012 | Annau et al. | 707/711 |
| 8,489,604 | B1* | 7/2013 | Sadovsky et al. | 707/737 |
| 8,661,029 | B1* | 2/2014 | Kim et al. | 707/723 |
| 2001/0044806 | A1 | 11/2001 | Ichiki et al. | |
| 2002/0116293 | A1* | 8/2002 | Lao et al. | 705/27 |
| 2003/0212760 | A1* | 11/2003 | Chen et al. | 709/218 |
| 2004/0093327 | A1* | 5/2004 | Anderson et al. | 707/3 |
| 2005/0060310 | A1* | 3/2005 | Tong et al. | 707/7 |
| 2005/0251444 | A1* | 11/2005 | Varian et al. | 705/14 |
| 2006/0004717 | A1 | 1/2006 | Ramarathnam et al. | |
| 2006/0259455 | A1* | 11/2006 | Anderson et al. | 707/1 |
| 2006/0259480 | A1* | 11/2006 | Zhang et al. | 707/5 |
| 2007/0027865 | A1* | 2/2007 | Bartz et al. | 707/5 |
| 2007/0094268 | A1* | 4/2007 | Tabe | 707/10 |
| 2008/0097955 | A1* | 4/2008 | Kapur | 707/1 |
| 2008/0133483 | A1* | 6/2008 | Bayley et al. | 707/3 |

(Continued)

OTHER PUBLICATIONS

Benz et al. "Characterizing Semantic Relatedness of Search Query Terms", In: Proceedings of the 1st Workshop on Explorative Analytics of Information Networks, EIN2009 Bled, Slovenia:, Sep. 2009.*

(Continued)

*Primary Examiner* — Shew-Fen Lin
(74) *Attorney, Agent, or Firm* — Sandy Swain; Micky Minhas

(57) ABSTRACT

Techniques for determining user information needs and selecting data based on user information needs are described herein. The present disclosure describes extracting topics of interests to users from multiple sources including search log data and social network website, and assigns a budget to each topic to stipulate the quota of data to be selected for each topic. The present disclosure also describes calculating similarities between gathered data and the topics, and selecting top related data with each topic subject to limit of the budget. A search engine may use the techniques described here to select data for its index.

19 Claims, 8 Drawing Sheets

(56) References Cited

U.S. PATENT DOCUMENTS

| | | | |
|---|---|---|---|
| 2008/0133505 A1* | 6/2008 | Bayley et al. | 707/5 |
| 2008/0235187 A1* | 9/2008 | Gade et al. | 707/3 |
| 2008/0275849 A1* | 11/2008 | Basu et al. | 707/3 |
| 2008/0281810 A1 | 11/2008 | Smyth et al. | |
| 2009/0254512 A1* | 10/2009 | Broder et al. | 707/2 |
| 2009/0259646 A1* | 10/2009 | Fujita et al. | 707/5 |
| 2010/0077174 A1* | 3/2010 | Ma et al. | 711/171 |
| 2010/0121849 A1* | 5/2010 | Goeldi | 707/736 |
| 2010/0185513 A1* | 7/2010 | Anderson et al. | 705/14.49 |
| 2010/0287462 A1 | 11/2010 | Hauser | |
| 2010/0306229 A1* | 12/2010 | Timm et al. | 707/767 |
| 2011/0078147 A1* | 3/2011 | Klinkner et al. | 707/740 |
| 2011/0119269 A1* | 5/2011 | Agrawal et al. | 707/737 |
| 2011/0213655 A1* | 9/2011 | Henkin et al. | 705/14.49 |

OTHER PUBLICATIONS

Guo et al. "A Structured Approach to Query Recommendation With Social Annotation Data", CIKM'10, Oct. 26-30, 2010.*

Chi et al., "Using Information Scent to Model User Information Needs and Actions on the Web"—Published Date: 2001 retrieved from <<http://www-users.cs.umn.edu/~echi/papers/chi2001/2001-04-scent-algo-final.pdf>>, 8 pages.

* cited by examiner

USER INFORMATION NEEDS BASED DATA SELECTION

BACKGROUND

With the big boom of information available on the internet, it is a challenge to effectively and efficiently select data meaningful to users from a massive amount of information. For example, search engines have become important tools for users to retrieve or organize data from the web. User experience of search engines largely depends on whether users can get enough useful information after the users submit queries to the search engines. Therefore search engines attempt to index as much data as possible to serve the user queries. However, due to performance and cost constraints, search engines usually index a limited number of data to answer the queries.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques" for instance, may refer to device(s), system(s), method(s) and/or computer executable instructions as permitted by the context above and throughout the present disclosure.

The present disclosure describes techniques for determining user information needs and selecting data at least partly based on user information needs. The user information needs predict topics of interests to a user, and may be extracted from multiple sources including search log data of a search engine or a social network website by different techniques. From the search log data, a topic cluster grouping similar queries can be generated based on a correlation between users, queries, and uniform resource locators (URLs). From the social network website, hot and popular topics can be extracted by analyzing terms in the web contents. A budget regarding how much data should be selected for each topic is calculated for or assigned to the topics from multiple sources. For topics from the search log data, the budget can be based on a hot degree and a diversity degree of the topic. For topics from the social network, a budget may be assigned.

The budget distribution between topics may be smoothed to allocate a portion of quota from high ranking topics to low ranking topics so that each topic may be represented by a fair number of data. Similarities between the topics and data are calculated. Top relevant data with a respective topic may be selected subject to the budget. Redundant data appearing in multiple topics may be removed so that each selected data is unique.

There can be many application scenarios of the present disclosure. One example is that the selected data can be indexed by the search engine to respond to user queries in the future.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
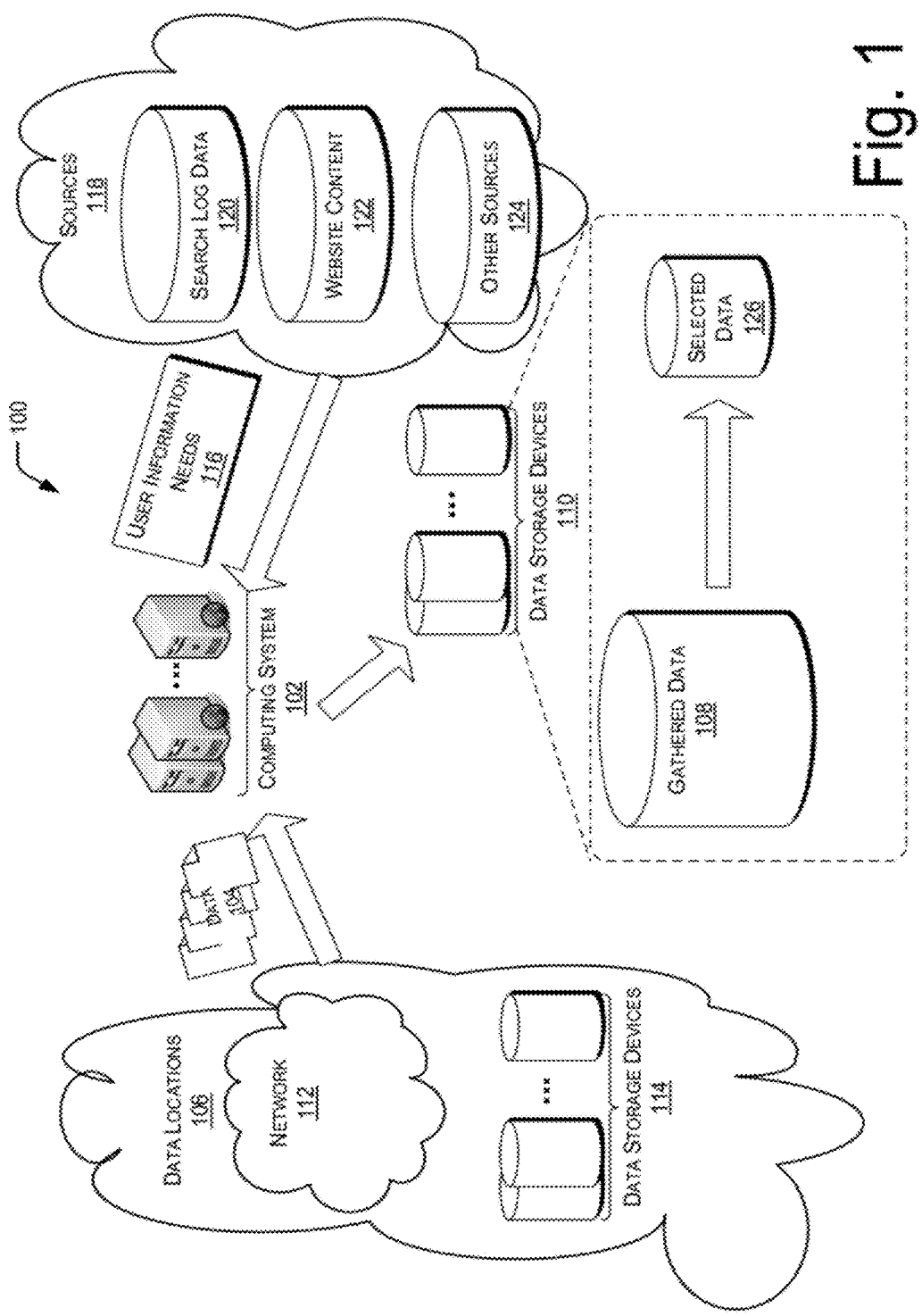
FIG. 1 illustrates an exemplary overview for data selection based on user information needs.

FIG. 1 illustrates an exemplary overview 100 for data selection based on user information needs.

As shown in FIG. 1, one or more computing systems 102 gather data 104 from one or more data locations 106. The gathered data 108 may be stored at the one or more computing systems 102. Alternatively, the gathered data 108 are stored in one or more remote data storage devices 110 as shown in the FIG. 1. The one or more computing systems 102 and the one or more remote data storage devices 110 are connected over wired and/or wireless networks.

The data 104 can be any documents such as webpages or identifications of documents, such as uniform resource locators (URLs) corresponding to the webpages available on the internet, or a combination of the documents and corresponding identifications. The one or more data locations 106 can be any place where the data 104 is available, such as a network 112 including internet or intranet, or one or more separate data storage devices 114.

The one or more computing systems 102 determine user information needs 116 according to information from one or more sources 118. It is appreciated that different techniques may be used to determine the user information needs 116 and such techniques may be different dependent upon the sources 118. Details of the techniques to determine user information needs 116 are discussed below.

The one or more sources 118 may include search log data 120, a website content 122 such as information from an online forum website or a social network website, and any other sources 124 such as internet surfing histories of users or a list of user information needs 116, such as an online directory, provided by a third party.

The user information needs 116 describe or predict topics of interests to a user. The user information needs 116 may have many forms. In one example, the user information needs 116 are represented as a set of topic-based representations. Each topic-based representation includes a set of terms and each term can be assigned or calculated a weight in the set. The terms in one set are related to each other. For example, the terms may be words or phrases representing same or similar meanings.

For example, from the search log data 120, the one or more computing systems 102 may generate a topic-based representation including a topic grouping similar queries together with a topic cluster clustering users and/or URLs associated with the queries in the topic based on a correlation between users, queries, and uniform resource locators (URLs). If two or more queries in the search log data 120 are associated with multiple identical URLs, the two or more queries are deemed related. The terms extracted from the queries are also deemed related. For another example, from the social network website, hot and popular topics may be extracted by methods such as analyzing frequency of terms in the web contents.

In some embodiments, the one or more computing systems 102 may further assign a budget to each topic-based representation. The budget is a quota of data to be selected for the respective topic-based representation. For example, the one or more computing systems 102 decide the budget based on a hot degree and/or a diversity degree of a respective topic-based representation. The hot degree is a measurement of users' interests in a respective topic. The diversity degree measures a number of unique data that are selected by the users relating to the respective topic. The applicability of and corresponding calculation techniques of the hot degree and/or the diversity degree may also be dependent upon the sources 118. For example, when the topic-based representations are extracted from the search log data 120, the hot degree may be evaluated by a number of queries submitted to the search engine, and the diversity degree of a respective topic-based representation may be a number of unique URLs clicked by the users in the topic cluster. For another example, when the topic-based representations are extracted from the website content 122, the hot degree of a respective topic-based representation is evaluated by frequencies of the topic appearing in the website content 122 and/or publishing dates of the webpages that containing the topic.

In some embodiments, the one or more computing systems 102 may further select a subset of the gathered data 108, i.e., selected data 126, at least partly based on the user information needs 116. For example, the one or more computing system 102 can calculate relevancy of the gathered data 108 with each of the topic-based representations. A number of data with top relevancy with a respective topic-based representation is selected. The number may be at least partly subject to the budget of the respective topic-based representations.

The selected data 126 may either be stored at the data storage devices 110 as shown in FIG. 1, or be transferred to another data storage device (not shown). Details of the techniques to select data based on user information needs are discussed below.

In some embodiments, the one or more computing systems 102 may further index the selected data 126. Such indexed selected data may be used to respond to user queries submitted to a search engine in the future. When the data 104 are identifications of documents, such as URLs, the gathered data 108 are also in the form of identifications of documents. The one or more computing systems 102 may further retrieve documents represented by the gathered data 108.

For illustration purpose only, the one or more computing systems 102, as shown in FIG. 1, are described to complete all of the operations such as gathering data, determining user information needs, selecting data, and/or indexing data. In different embodiments, such operations may, in fact, be completed in one computing system, distributed among different multiple computing systems, or provided by a third-party provider separate from the one or more computing systems 102. In some embodiments, some operations such as the operation to gather data 104 may be even omitted. For example, the data 104 is already gathered and collected as the gathered data 108 available to the one or more computing systems 102.

The one or more computing systems 102, the one or more data storage devices 110, and the one or more data storage devices 114 are distinct in FIG. 1. In some embodiments, however, these devices can be identical or integrated. For example, the one or more computing systems 102 are servers of a search engine. The one or more data storage devices 114, where the data 104 are available, may be part of the one or more computing systems 102 such that the computing systems 102 have already crawled a large volume of data from the network 112. The one or more data storage devices 110, where the gathered data 108 are available, may also be part of the one or more computing systems 102 when these servers store the gathered data 108. It is also appreciated that the one or more computing systems 102 and the one or more data storage devices 110 or 114 can be a distributed system, in which these devices can be physically located at different locations.

The one or more sources 118, as shown in FIG. 1, are distinct from the one or more computing systems 102 and the one or more data locations 106. In some embodiments, the one or more source 118 may locate at the one or more computing systems 102 or the one or more data locations 106. For instance, when the one or more computing systems 102 are servers of the search engine, the search log data 120 may locate at the one or more computing systems 102. The website content 122 may locate over the network 112 of the one or more data locations 106.

It is appreciated that there are many application scenarios and embodiments in accordance with the present disclosure. In one embodiment, the one or more computing systems 102 is a stand-alone computer and uses the user information needs 116 to organize or select data stored in a single computer storage media.

In another embodiment, the one or more computer systems 102 are servers of the search engine. The servers crawl data 104 such as tens of billions webpages from the network 112 where trillions of data are available, selects billions of webpages from the gathered data 108 at least partly based on the user information needs 116, and then index the selected data 126 to respond to user queries in the future.

Exemplary methods for performing techniques described herein are discussed in details below. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The methods may, but need not necessarily, be implemented using the one or more computing systems 102 of FIG. 1. For example, a third-party computing system (not shown) can determine the user information needs 116 and then transmit the results to the one or more computing systems 102. For convenience, the methods are described below in the context of the one or more computing systems 102 and environment 100 of FIG. 1. However, the methods are not limited to implementation in this environment.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Determining User Information Needs

Figure 2:
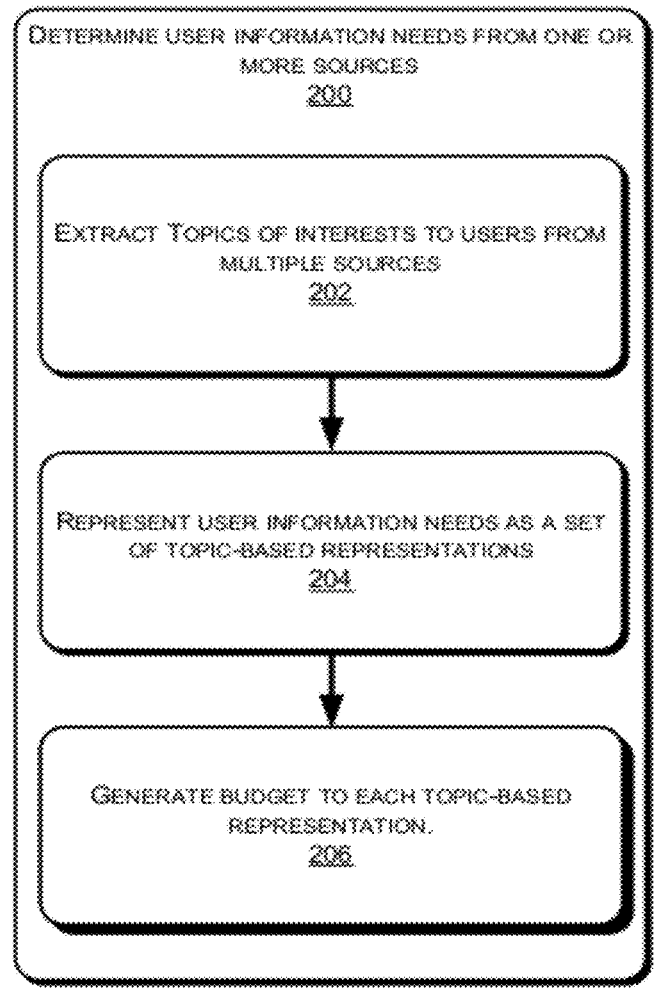
FIG. 2 is a flowchart showing an illustrative method of determining the user information needs from one or more sources.

FIG. 2 is a flowchart showing an illustrative method 200 of determining the user information needs 116 from the one or more sources 118.

At block 202, the one or more computing systems 102 extract topics of interests to users from different sources 118.

At block 204, the one or more computing systems 102 represent the user information needs 116 as a set of topic-based representations. For example, each topic-based representation includes a set of terms. These terms are related to each other. A weight of each term in the set may be calculated or assigned.

At block 206, the one or more computing systems 102 generate a budget to each topic-based representation. The budget is a quota of data to be selected for a respective topic-based representation.

At a respective block, the one or more computing systems 102 may use same or different techniques dependent upon the sources 118.

Figure 3:
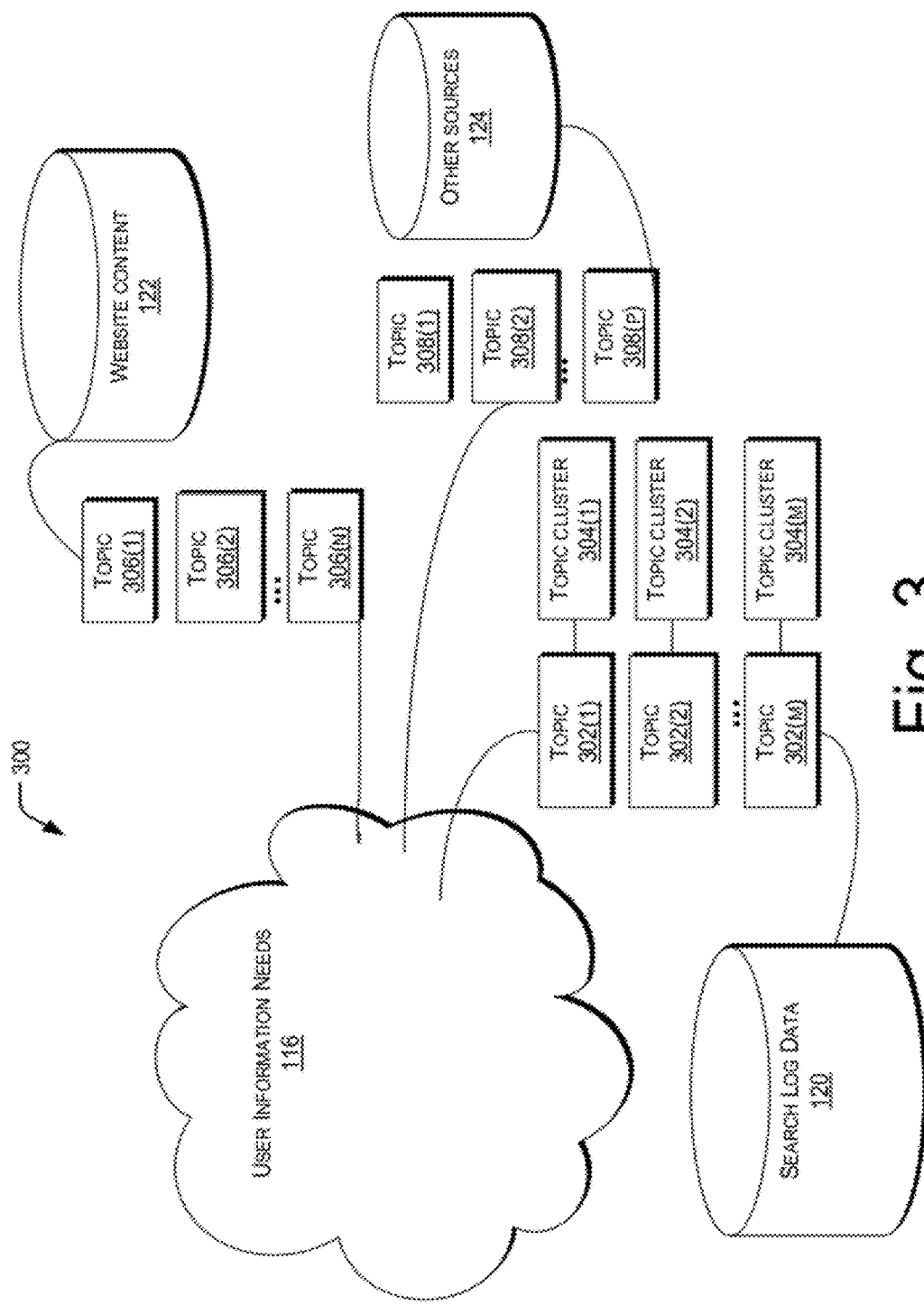
FIG. 3 illustrates an exemplary schematic diagram to determine user information needs from the one or more sources.

FIG. 3 illustrates an exemplary schematic diagram 300 to determine user information needs 116 from the one or more sources 118.

The user information needs 116 may be extracted from multiple sources, such as queries issued to the search engine contained in the search log data 120, topics discussed in the social network and forums contained in the website content 122, and topics extracted from the other sources 124. These obtained topics are exemplary representations of the user information needs 118.

The one or more computing systems 102 may extract topics 302(1), 302(2), ..., 302(m) from the search log data 120. The parameter m can be any integer. The search log data 120 includes information of queries, users who submit the queries, URLs that are associated with the queries, and a correlation between the queries, users, and URLs. As the topics are extracted from the queries already submitted by users, the extracted topics from the search log data 120 reflect topics already of interest to the users.

In one example, the one or more computing systems 102 may analyze the semantics of the queries to group queries with same or similar meanings into a topic.

In another example, the one or more computing systems 102 may analyze the correlation between the queries, users, and URLs, and group queries associated with multiple common URLs and/or users into a topic. The queries or terms extracted from the queries are a set of terms of the topic. The topic-based representation also includes a topic cluster associated with the topic. The topic cluster includes users and/or URLs associated with the set of terms in the topic. For example, the users in the respective topic cluster are users who submit the queries included in the topic and the URLs are URLs that respond to the queries included in the topic. For instance, a topic 302(1) is associated with a topic cluster 304(1), topic 301(2) is associated with a topic cluster 304(2), and a topic cluster 304(m) is associated with a topic cluster 304(m). The parameter m can be any integer. The one or more computing system 102 may further calculate the budget for each topic cluster based on a hot degree of the topic cluster (a number of queries submitted to the search engine in a predefined period of time) and a diversity degree of the topic cluster (a number of unique URLs clicked by the users). Exemplary generation of topics from the search log data 120 will be described in more details below.

The one or more computing systems 102 may also extract topics 306(1), 306(2), ..., 306(n) from the website content 122. The parameter n can be any integer. The website content 122 includes information available at an online forum website or a social network website. For example, the one or more computing systems 102 may analyze frequency of words appearing in the website content 122, choose words with high frequencies, and group words with same or similar meanings into a topic. The words with same or similar meanings are a set of terms of the topic. The one or more computing systems 102 may rank the topics obtained from the website content 122 based on a plurality of factors. The plurality of factors may include a popularity degree such as frequencies of terms in the topic and a freshness degree of the data such as the publishing date of the webpage where a respective topic is obtained. For another example, topic modeling techniques such as latent Dirichlet allocation (LDA) and latent semantic analysis (LSA) may also be used to extract the topics.

The topics obtained from the website content 122 are predictions of topics might be interested to the users in the future. These topics 306(1), 306(2), ..., 306(n) are not associated with an existing cluster different from topics 302(1), 302(2), ... 302(m) obtained from the search log data 120. The one or more computing systems 102 may further assign a budget to the topics 306(1), 306(2), ..., 306(n), which may be at least partly based on ranking of the topics in the popularity degree and/or the freshness degree of the data where the topics are obtained.

The one or more computing systems 102 may also extract topics 308(1), 308(2), ..., 308(p) from the other sources 124. The parameter p can be any integer. For example, the one or more computing systems 102 analyze data that includes web surfing histories of the users. For another example, the one or more computing systems 102 receive or retrieve a list of topics provided by a third party. Such third party may include an online directory such as open directory project (ODP) from http://www.dmoz.org/ and yahoo directory. These topics can be used to supplement topics extracted from the other sources or guarantee that the topic-based representations contain information about general topics in the world. The one or more computing systems 102 may further assign a budget to each of the topics 308(1), 308(2), ..., 308(p).

As the total budget to the topics extracted from multiple sources is limited due to computing and economic costs of the computing systems 102, there can be different techniques to allocate budget among different sources.

In one example, the one or more computing systems 102 assign different budgets to different sources 108. The one or more computing systems 102 may assign a first total budge to the topics extracted from the search log data 120, a second total budget to the topics extracted from the website content 122, and a third total budget to the topics extracted from the other sources 124.

In another example, the one or more computing systems 102 may adjust the budget of one or more topics from one source by considering its appearance in another source. For instance, the topics obtained from different sources 118 may overlap with each other. The one or more computing systems 102 may compare the set of terms in a topic from the search log data 120, such as the topic 302(1), with the set of terms in another topic from the website content 122, such as the topic 304(1), or another topic from a directory, such as the topic 306(1), from the other sources 124, and determine whether these topics are identical or similar by finding whether these two topics share multiple common terms. The one or more computing systems 102 may deem the two topics 302(1) and 304(1) are identical or similar if they share multiple common terms, keep the topic 302(1) and remove the topic 304(1), and increase the budget of the topic 302(1) as the topic appearing in different sources are deemed more popular.

Selecting Data Based on User Information Needs

Figure 4:
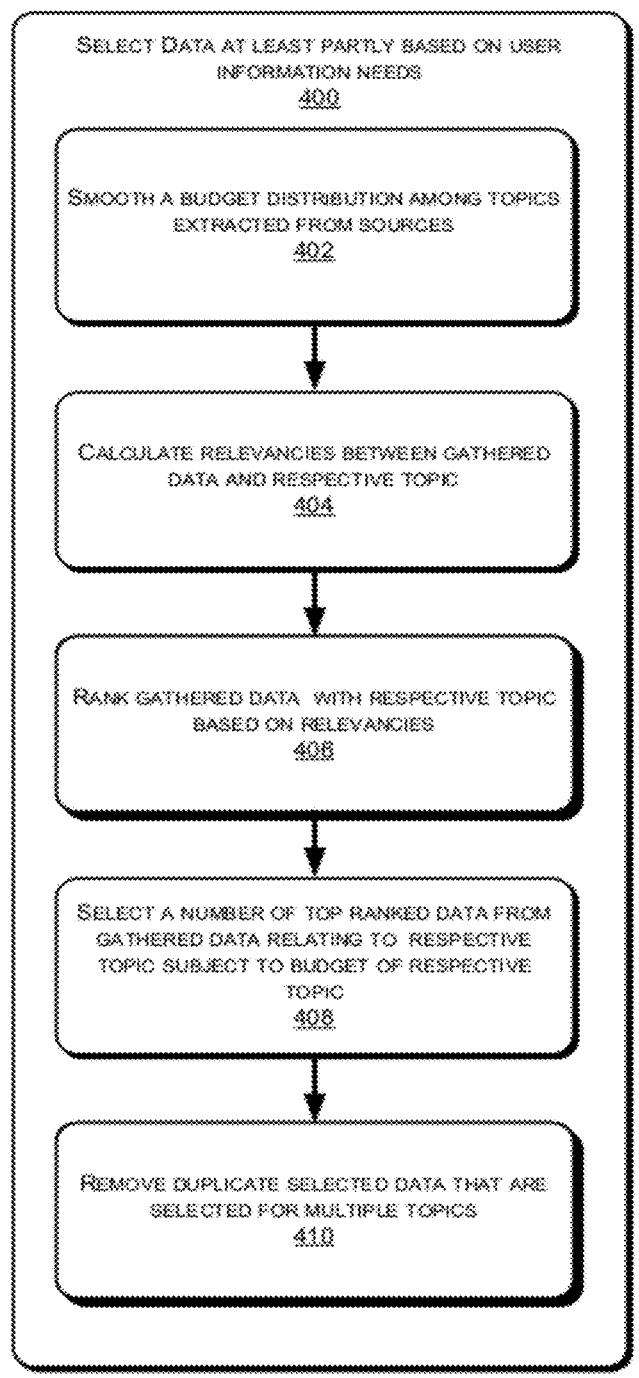
FIG. 4 is a flowchart showing an illustrative method of selecting data at least partly based on the user information needs.

FIG. 4 is a flowchart showing an illustrative method 400 of selecting data at least partly based on the user information needs 116.

At block 402, the one or more computing systems 102 smooth a budget distribution among the topics extracted from the sources 118. For example, an entire budget of all of the topics is limited. The budgets calculated for or assigned to topics with high popularity may use almost the entire budget. Thus some topics may have no or very few budget and thus have no fair representation of data. The one or more computing systems 102 may remove a portion of quota from topics with high popularity to topics with low popularity so that each topic may have a fair representation of data in the selected data 126.

At block 404, the one or more computing systems 102 calculate relevancies between the gathered data 108 and a respective topic extracted from the sources 118. For example, the one or more computing systems 102 can compare the words in a webpage with the set of terms in the respective topic to calculate the relevancy between a respective webpage and a respective topic.

At block 406, the one or more computing systems 102 rank the gathered data 108 with a respective topic based on the relevancies.

At block 408, the one or more computing systems 102 select a number of top ranked data from the gathered data 108 relating to the respective topic subject to the budget of the respective topic. In some examples, the one or more computing systems 102 stop ranking the gathered data in relevancies with the respective topic when the number of selected top rank data reach the budget.

The one or more computing systems 102 continue to choose the top ranked data for each topic in the topics extracted from the sources 118.

At block 410, the one or more computing systems 102 remove the duplicate selected data that are selected as top ranked data for multiple topics. Therefore, the one or more computing systems 102 guarantee the uniqueness of each data in the selected data 126.

Figure 5:
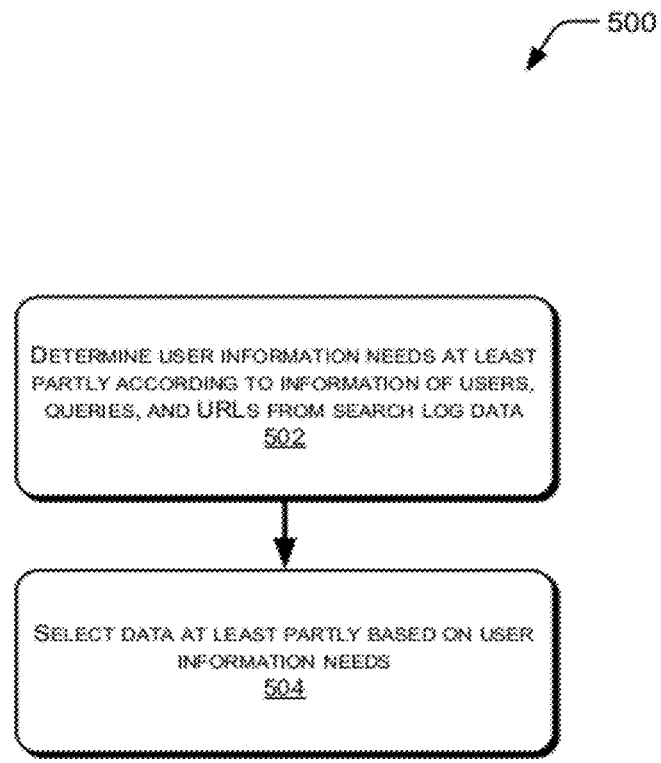
FIG. 5 is a flowchart showing an illustrative method of determining the user information needs from the search log data.

Exemplary Embodiment of Selecting Data Based on User Information Needs from the Search Log Data FIG. 5 is a flowchart showing an illustrative method 500 of selecting data based on user information needs 116 from the search log data 120. Some of the techniques described in the exemplary embodiment may also be applicable in the other embodiments of the present disclosure.

At block 502, the one or more computing systems 102 determine user information needs at least partly according to information of users, queries submitted by the users, and identifications of the documents returned by the search engine responding to the queries, such as URLs, associated with the queries. Such information can be retrieved from the search log data 120. The data may be represented by other forms of identifications in the search log data 120. Alternatively, the one or more computing systems 102 may assign unique identifications to the data.

At block 504, the one or more computing systems 102 select data at least partly based on the user information needs 116.

The operations in each block are further described below.

Figure 6:
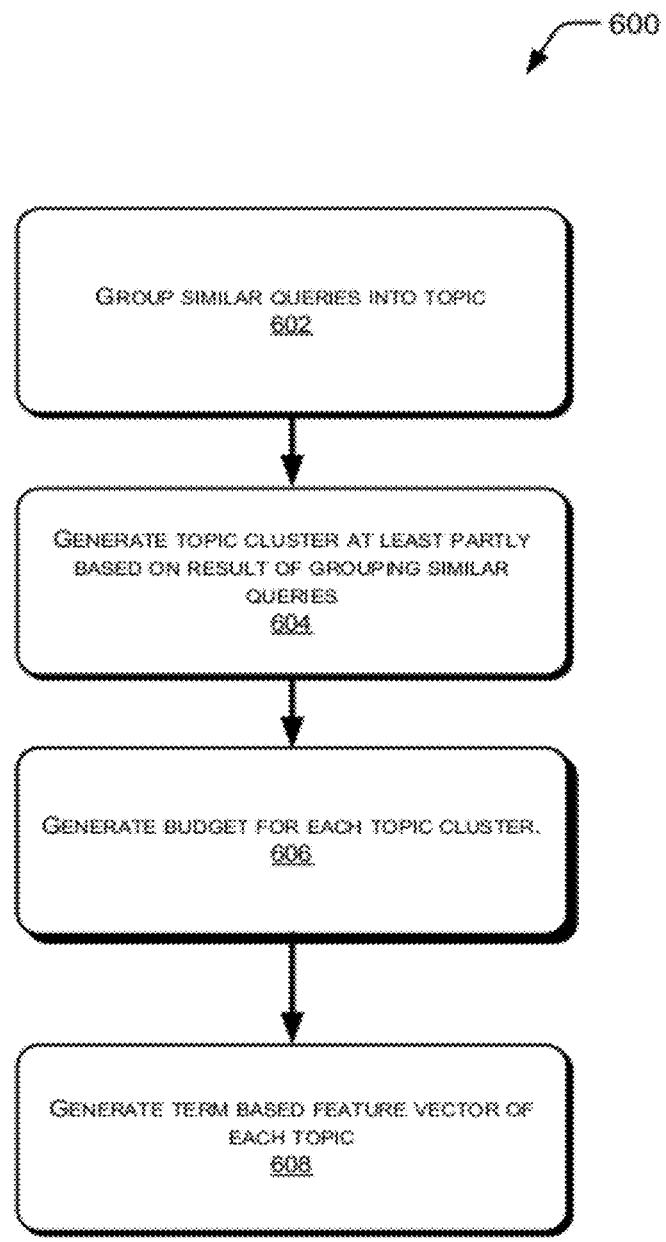
FIG. 6 is a flowchart showing an illustrative method of selecting data according to the user information needs extracted from the search log data.

FIG. 6 is a flowchart showing an illustrative method 600 of determining the user information needs 116 from the search log data 120.

At 602, the one or more computing systems 102 group similar queries into a topic.

The search log data 120 includes information of queries, users who submit the queries, URLs that are associated with the queries, and a correlation between the queries, users, and URLs.

To group similar queries into a topic, the one or more computing systems 102 measure similarities between queries. An exemplary method is to construct a user-query-URL graph. In one example, the URLs may only refer to the URLs that are returned by the search engine corresponding to a respective query. In another example, the URLs can be further divided into returned URLs and clicked URLs that refer to URLs clicked by the users among the returned URLs.

The one or more computing systems 102 may retrieve the correlation information from the search log data 120 and use the information to construct a user-query-URL graph. Table 1 shows an example of a correlation between the user, query, and URL according to information from the search log data 120. In the example of Table 1, the search log data 120 includes information of both returned URLs and clicked URLs.

TABLE 1

| User-Query-URL Correlation | | | |
|---|---|---|---|
| User ID | Query | Returned URLs | Clicked URLs |
| User1 | gmail | http://mail.google.com/mail, http://en.wikipedia.org/wiki/Gmail, . . . | http://mail.google.com/mail/ |
| User2 | ebay | http://www.ebay.com, http://www.motors.ebay.com, . . . | http://www.ebay.com |
| User1 | facebook | http://www.facebook.com, http://en.wikipedia.org/wiki/Facebook, . . . | http://www.facebook.com |
| . . . | . . . | . . . | . . . |

There can be one-to-one or one-to-many mappings between each two of the user ID, the query, the returned URLs, and the clicked URLs. For example, a given query, such as "facebook," can be submitted by both user 1 and user 2, and a given returned URL or clicked URL, such as http://www.facebook.com, can correspond to different queries, such as query "facebook" and query "social network" (not shown in the Table 1). For example, the correlation between the users, queries, and URLs, or a user-query-URL graph can be obtained from a mapping centered by any of the users, the queries, or the URLs based on multiple mappings between each two of the users, the queries and the URLs.

A user node is created for each unique user in the search log data 120. Similarly, a query node is created for each unique query and a URL node is created for each unique URL in the search log data 120. An edge $e_{i,j}^1$ is created between user node $user_i$ and query node $q_j$ if $user_i$ raise $q_j$s; an edge $e_{i,j}^2$ is created between query node $q_i$ and URL node $URL_j$ if user raises $q_i$ and search engine returns $URL_j$ or user clicks $URL_j$. The weight $w_{i,j}^1$ of $e_{i,j}^1$ is the total number of times when $user_i$ raises $q_j$ aggregated over the whole log; the weight $w_{i,j}^2$ of $e_{i,j}^2$ is the total number of times when search engine return $URL_j$ or user clicks $URL_j$ when issuing $q_i$.

The returned URLs and the clicked URLS may be treated differently as one would appreciate that the clicked URLs clicked by the users are more relevant to the queries than the returned URLs: clicked $(w_{i,j}^2) = \lambda$ returned $(w_{i,j}^2)$ ($\lambda > 1$). $\lambda$ is a parameter evaluating the conversion relationship between the returned URL and the clicked URL. In one example, $\lambda$ is set to 4.

The one or more computing systems 102 may use the tripartite graph to find similar queries. For example, if two queries share multiple users and URLs, the one or more computing systems 102 determine that they are similar to each other. From the tripartite graph, each query $q_i$ is represented as two different feature vectors: one is modeled by user feature, the other is modeled by URL feature. The form of these two feature vectors is $$\begin{cases} \vec{q_i}(user) = [w_{1,i}^1, w_{2,i}^1, \ldots, w_{N,i}^1] \\ \vec{q_i}(URL) = [w_{i,1}^2, w_{i,2}^2, \ldots, w_{i,M}^2] \end{cases} \quad (1)$$

If $e_{i,j}^1$ does not exist, then $w_{i,j}^1 = 0$; and if $e_{i,j}^2$ does not exist, then $w_{i,j}^2 = 0$. N is the total number of users and M is the total number of URLs. With these two queries' feature vectors, the similarity between the two queries $q_i$ and $q_j$ can be calculated as follows:

$$\text{Similarity}(q_i, q_j) = \alpha \frac{\vec{q_i}(user) \cdot \vec{q_j}(user)}{|\vec{q_i}(user)| \times |\vec{q_j}(user)|} + \quad (2)$$

$$(1-\alpha) \frac{\vec{q_i}(URL) \cdot \vec{q_j}(URL)}{|\vec{q_i}(URL)| \times |\vec{q_j}(URL)|}$$

$$= \alpha \frac{\sum_{k=1}^{N}(w_{k,i}^1 \times w_{k,j}^1)}{\sqrt{\left(\sum_{k=1}^{N} w_{k,i}^{1^2}\right)\left(\sum_{k=1}^{N} w_{k,j}^{1^2}\right)}} +$$

$$(1-\alpha) \frac{\sum_{k=1}^{N}(w_{i,k}^2 \times w_{j,k}^2)}{\sqrt{\left(\sum_{k=1}^{N} w_{i,k}^{2^2}\right)\left(\sum_{k=1}^{N} w_{j,k}^{2^2}\right)}}$$

$\alpha$ is a parameter that balances the contributions of user feature vector and URL feature vector to query. The parameter $\alpha$ can be defined by the one or more computing systems 102. In one example, it is appreciated that two queries are more relevant when they share the same URLs than they share the same users, i.e., $\alpha$ should be less than 0.5. In one example, $\alpha$ is set to 0.3.

At 604, the one or more computing systems 102 generate a topic cluster at least partly based on a result of grouping similar queries. The one or more computing systems 102 group similar queries associated with a common topic and the users/URLs associated with the similar queries into a topic cluster.

The one or more computing systems 102 generate a plurality of topic clusters that are topic centered. Each topic includes similar queries and/or terms extracted from the similar queries, and associates with users who submit the similar queries and URLs that respond to the similar queries based on the feature vectors as shown in formula (1) above. As shown in Table 1, the one or more computing systems 102 can also obtain URL-centered clusters and user-centered clusters based on the user-query-URL graph. Alternatively, the one or more computing systems 102 may invert the topic-center clusters into the user-centered clusters or the URL-centered clusters. An exemplary K-Means clustering method is shown in Algorithm 1 below. For purpose to simplify illustration, sometimes the query-centered cluster is used below, such as the description in the Algorithm 1, without considering grouping similar queries into a topic or extracting terms from the similar queries. The techniques described below can be easily applied to the topic clusters, however.

---

Algorithm 1
Clustering queries

---

Input: the set of query's feature vectors $\vec{Q}$;
    the clusters number K;
Output: the set of clusters $\Theta$;
Initialization: the initial set of centers' feature vector $\vec{C}$;
    partition $\vec{Q}$ to all machines;
1: distribute $\vec{C}$ to all machines;
2: invert $\vec{C}$ to get user-centroid mapping and URL-centroid mapping;
3: for each $\vec{q_i} \in \vec{Q}$ do
4:    with each entry in $\vec{q_i}$, search two mapping tables and get the subset of $\vec{C}$: $\vec{C'}$;
5:    for each $\vec{C'}[j] \in \vec{C'}$ do
6:        calculate Similarity($\vec{q_i}, \vec{C'}[j]$);
7:        find the maximum Similarity($\vec{q_i}, \vec{C'}[max]$), and update new centroid $\overrightarrow{C_{new}}[max]$;
8:    add $q_i$ to $\Theta[max]$;
9: if Similarity($\vec{C}, \overrightarrow{C_{new}}$) < threshold then
10:    $\vec{C} = \overrightarrow{C_{new}}$, and go to step1;
11: else break;
12: RETURN $\Theta$

---

For example, the machines in the Algorithm 1 refer to the one or more computing systems 102.

In one example, the one or more computing systems 102 set K=1 million. The one or more computing systems 102 may follow two guidelines when first selecting K queries' feature vector as initialized K centers: (a) to select the K centers which have no similarity between each other; and (b) the K query vectors' dimension is larger than the rest of the query set.

In some scenarios, the search log data 120 may include a large scale of data. For example, the number of topic clusters are at millions level and the nodes of queries reach billions level. The one or more computing systems 102 may operate in a distributed manner, and partition the user-query-URL tripartite graph data into different computing systems. There is a challenge to the computing cost and saving all user-query-URL tripartite correlation from the search log data 120 in the memories of each computing system 102.

The one or more computing systems 102 may use different techniques to cut down the computing costs. For example, the one or more computing systems 102 do not need to compare a query with each of the other queries. Instead, the one or more computing systems 102 select queries with common users and/or URLs to compare.

Table 2 is an exemplary cluster centers based on the query-user-URL tripartite graph. Each cluster center corresponds to a query. For example, the cluster center 1 corresponds to one query and the user 1, user 2, user 5 are the users who submit the queries and the URL1, URL3, URL8 are the returned URLs correspond to the queries. The table 2 shows a query-centered mapping between the queries and users and URLs. For example, the query m cluster is associated with query m and maps onto the users who submit query m and URLs that are returned by the search engine responding to query m.

TABLE 2

Exemplary Cluster Centers Based on the Query-User-URL Tripartite Graph

| Query-centered Cluster | Features |
|---|---|
| query 1 cluster | user1, user2, user3, user5, URL1, URL3, URL8 . . . |
| query 2 cluster | user1, user3, user8, user100, URL2, URL3, URL 5 . . . |
| query 3 cluster | user4, user7, user100, user120, URL3, URL4, URL6 . . . |
| . . . | . . . |
| query m cluster | user 1, user r, user 90, URL 2, URL80, URL q |

The parameters m, r, and q in the Table 2 can by any integer.

The one or more computing systems 102 may invert the table 2 to obtain a user-center mapping and a URL-center mapping. For example, based on the Table 2, in the user-center mapping, the user 1 maps to the query 1 cluster, the query 2 cluster, and the query m cluster; and the user 2 maps to the query 1 cluster. Based on the Table 2, in the URL-center mapping, the URL1 maps to the query 1 cluster, and the URL2 maps to the query 2 cluster and the query m cluster.

As discussed above, such as shown in Table 1, each query is associated with one or more users and one or more URLs. For instance, there is another query t (not shown in the Table 1 or 2) cluster that is associated with query t and maps onto user 1 and the user 4 and the URL 2, URL 9. t can be any integer.

The one or more computing systems 102 search the user-center mapping and the URL-center mapping, and compare the query t with queries having common users and URLs with the query t. For instance, as the query t is associated with the user 1, and in the user-center mapping, the user 1 maps to the query 1 cluster, query 2 cluster, and query m cluster. Thus the query t is relevant to the query 1, query 2, and query m according to the user-center mapping.

As the query t is associated with the URL2, and in the URL-center mapping, the user 2 maps to the query 2 cluster and the query m cluster. Thus the query t is relevant to the query 2 and query m according to the UR-center mapping.

After combining analysis of common users and/or URLs, the one or more computing systems 102 compare the query t with queries 2 and m that share common users and URLs.

As the query t has no common users and URLs with the query 3 cluster, the one or more computing systems 102 do not compare the query t with query 3.

In some examples, the one or more computing systems 102 may compare the queries when a number of common users and/or URLs reach a threshold. Alternatively, the one or more computing systems 102 may compare the queries based on a result of either the user-center mapping or the URL-center mapping, or put a heavier weight on a result of the URL-center mapping. For example, if the one or more computing systems 102 consider a combination of common users or common URLs, the query t is to be compared with query 1, query 2, and query m.

The one or more computing systems 102 may also reduce the storage and computing cost without saving the identical user-query-URL tripartite correlation in each of the computing systems 102. For example, for a particular computing system of the computing systems 102, such computing system may only process a small set of queries in the search log data 120. A lot of feature entries in the cluster center table, as shown in the Table 2, may have no or very limited impacts on the results with respect to a particular computing system. As an example of query 1 cluster in the Table 2, if on the particular computing system, all the process queries do not have or have limited number of features such as user1 and URL1, then such entries in the Table 2 may be removed. Based on query data processed by the particular computing system, the users and URLs associated with the query can be obtained. Based on the user-center mapping and/or the URL-center mapping, the one or more computing systems 102 filter the user-query-URL tripartite correlation, and only store information of the query clusters having common users and URLs with the query data processed by the particular computing system.

In some examples, the one or more computing systems 102 use a fast copy process to distribute the information of the cluster centers, such as the cluster center table as shown in the Table 2, to different computing systems. For example, the one or more computing systems 102 are grouped into different groups. The groups are interconnected by switches. As the data transfer speed between the switches is much slower than that within the switches, a copy of information of the cluster centers is firstly transmitted to one computing system in each group. Such computing system then transfers the copy to the other computing systems within a same group in parallel among different groups.

After applying the above exemplary method, the one or more computing systems 102 obtain a number of query clusters.

At 606, the one or more computing systems 102 generate a budget for each topic cluster. The budget is used to select optimal URLs to match a topic distribution.

In an exemplary method, the one or more computing systems 102 may consider two features of the topic cluster for generation of the budget.

One is the user's degree of interest on these topics. In other words, it's the topic's hot degree. For example, the hot degree can be defined by the following formula:

$$\text{hot degree}_i = \Sigma_{q_j \in C_i} \text{issue\_count}(q_j) (1 \leq i \leq K) \quad (3)$$

It means that topic $c_i$'s hot degree is the sum of all queries' issue numbers in cluster i; and K is the total number of topics and issue_count($q_j$) is query $q_j$'s issue number by users.

However, this "hot degree" measurement alone may be sometimes not enough for index selection. For example, the users may raise a query many times, but did not click any URL or only clicked a few URLs. Although it seems that the topic which contains this query term is quite hot, however, the returned or clicked URLs may be too few. For instance, "facebook" may be one of the hottest queries on the internet, but almost all the users who input this query clicked only one URL: "www.facebook.com." Thus even if this query is very hot, only a few URLs for this query may be enough, and its diversity degree is low.

Therefore the one or more computing systems 102 consider another measurement to model this case: diversity degree. This measurement indicates a query's diversity, which means that if a query is not only hot but also targets lots of unique clicked URLs, the one or more computing systems 102 should select more URL indexes for this query's topic. For example, the diversity degree can be defined by the following formula:

$$\text{diversity degree}_i = \Sigma_{q_j \in C_i} \text{unique\_clickURL\_count}(q_j)$$
$$(1 \leq i \leq K) \quad (4)$$

It means that topic $c_i$'s diversity degree is the sum of all queries' unique clicked URLs' numbers in cluster i.

The one or more computing systems 102 can combine the two measurements, i.e., hot degree and diversity degree, to obtain a index selection degree of current topic:

$$\text{ISdegree}_i = \alpha \times \text{hot degree}_i + (1-\alpha) \times \text{diversity degree}_i \quad (5)$$

The ISdegree$_i$ means the index selection degree of topic $c_i$; and $\alpha$ is the balance parameter of two measurements. For example, $\alpha$ can be set to 0.5.

The one or more computing systems 102 may calculate the budget for the respective topic cluster at least partly based on the index selection degree and a total budget for all of the topics.

At 608, the one or more computing systems 102 generate a term-based feature vector of each topic.

In one example, the topic can be directly represented by a group of similar queries. In another example, the one or more computing systems 102 parse the queries into several key words (terms) using word breaker, then use these terms as the feature to represent topics.

Simply breaking a phrase into separate words would probably lead to poor precision and bring in unrelated data to the topic-cluster. For example, "Beijing Normal University" would be split into three terms: "Beijing," "Normal," and "University." However, "Beijing Normal University" refers to a specific university. Each term in the phrase would introduce much broader and irrelevant data. Thus, in still another example, the one or more computing systems 102 group common phrases and personal names into a single term which is more precise and excludes noise.

The one or more computing systems 102 then obtain a set of terms for each topic: topic $c_i = \{\text{term}_1, \text{term}_3, \text{term}_j, \ldots\}$, and defines each term$_i$'s the weight $w_{i,j}$ for topic $c_j$. For example, the term frequency-inverse document frequency (tf-idf) formula described below can be used to model each term's weight, $$w_{i,j} = tf_{i,j} \cdot idf_i = \frac{n_{i,j}}{\sum_k n_{k,j}} \cdot \log \frac{|\text{Topic}|}{1 + |\{\text{topic}: t_i \in \text{topic}\}|} \quad (6)$$

Where $n_{i,j}$ is the number of occurrences of the considered term t, in topic topic $c_j$, and the denominator $\Sigma_k n_{k,j}$ is the sum of number of occurrences of all terms in topic $c_j$; |Topic| is the total number of topics, and |{topic:$t_i \in$topic}| is the number of topics where the term $t_i$ appears (that is $n_{i,j} \neq 0$).

With the techniques described above, the one or more computing systems 102 generate the term-based feature vector for each topic:

$$\overrightarrow{\text{topic}c_1} = [w1, i, w2, i, \ldots, wT, i] \quad (7)$$

$w_{k,i} = 0$ if term$_k$ does not appear in topic $c_i$, and T is the total number of terms.

In some examples, the one or more computing systems 102 also associate the respective topic cluster with the budget.

Figure 7:
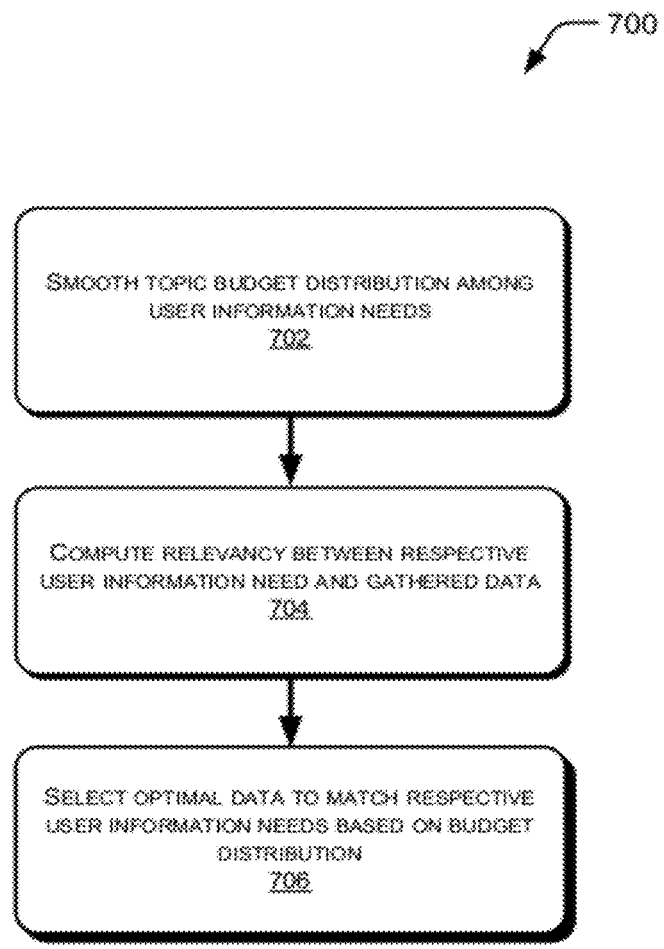
FIG. 7 illustrates an exemplary computing system.

FIG. 7 is a flowchart showing an illustrative method 700 of selecting data according to the user information needs 116.

At 702, the one or more computing systems 102 smooth the topic budget distribution among the user information needs 116. The topic cluster discussed above is an exemplary representation of the user information needs 116. The smoothing ensures that tail topics with low popularities can obtain enough quota in the selected data 126.

As described above, each topic cluster is associated with (a) a set of terms with the weights which represent the information of the cluster; (b) a budget indicative of how much data should be considered to index for the cluster. However, the topic distribution is quite unbalanced between head queries with high popularities and tail queries with low popularities. Given a limited size of index, if data selection is strictly according to this distribution, the number of data to be selected to the long-tail topics might become very small and even zero. To avoid the selection bias towards popular topics, there is a need to smooth the mined topic distribution. For example, an exemplary uniform distribution method can be described by the following formula:

$$P_{new}(t_k|X) = aP(t_k|X) + (1-a)P_0(t_k) \quad (8)$$

$P(t_k|X)$ means topic k's budget is computed based on X. X represents the data of query in the search log data 120. The probabilistic representation is used to represent a budget allocated to a respective topic following a distribution. To obtain the distribution, the index degree of all the topics may be added up at first. The index degree of a respective topic may be obtained by considering the hot degree and/or the diversity degree as shown in the formula (5) above. Then for example, a formula can be used to calculate:

$$P(t_k|X) = \text{index degree}(i)/\Sigma \text{index degree}(j) \quad (9)$$

$P_0(t_k)$ represents a pre-allocation to the topic k, which is not determined by the data of query in the search log data 120 and may be regarded as prior knowledge. By adjustment of the parameter a, a more even distribution among topics can be obtained. The selection of budget is based on the distribution of topics, that is if a number of N document is to be selected as the entire index, the topic distribution on the selected index should align well with the $P_{new}(t_k|X)$.

By smoothing, the one or more computing systems 102 transfer some quota originally allocated for the head topics to the tail topics.

At 704, the one or more computing systems 102 compute a relevancy between a respective user information need from the user information needs 116 and the gathered data 108. For example, the one or more computing systems 102 compare a respective topic cluster with data represented by the URLs in the gathered data 108.

For instance, similar to generation of the topic clusters, the one or more computing systems 102 generate the term based feature vector for each URL. The form of each URL's feature vector is:

$$\overrightarrow{URL_i} = [w'_{1,i}, w'_{2,i}, \ldots, w'_{T,i}] \quad (10)$$

$$w'_{k,i} = tf_{k,i} \cdot idf_k = \frac{n_{k,i}}{\sum_j n_{j,i}} \cdot \log \frac{|URL|}{1 + |\{url : t_k \in url\}|} \quad (11)$$

$w'_{k,i}$ is the tf-idf the weight of term$_k$ in URL$_i$. While in formula (11), $n_{k,i}$ is the number of occurrences of term $t_k$ in URL$_i$, and $\Sigma_j n_{j,i}$ is the sum of number of occurrences of all terms in URL$_i$; |URL| is the total number of URLs, and |{url:$t_k \in$url}| is the number of URLs where the term $t_k$ appears (that is $n_{k,i} \neq 0$).

The URL represents an identification of respective data. For illustrative purpose to simplify description, the present disclosure sometimes uses the URL to represent the respective data, such as the techniques discussed above.

An exemplary cosine similarity method can be used to model this relevance according to the formula below:

$$\text{relevance}(topic_i, URL_j) = \quad (13)$$

$$\frac{\overrightarrow{topic_i} \cdot \overrightarrow{URL_j}}{|\overrightarrow{topic_i}| \times |\overrightarrow{URL_j}|} = \frac{\sum_{k=1}^{T}(w_{k,i} \times w'_{k,j})}{\sqrt{\left(\sum_{k=1}^{T} w_{k,i}^2\right)\left(\sum_{k=1}^{n} w_{k,j}'^2\right)}}$$

In a scenario where there are millions of topics and billions of URL pages, the computation complex of comparing each topic with each URL is high. In one example, the one or more computing systems 102 obtain a term-topic mapping table by inverting the topic's feature vector to reduce the computation complex.

When the one or more systems 102 obtain a URL and compute its relevance to all topics, the one or more systems 102 first search this term-topic mapping table with all term entries in this URL's feature vector to obtain a subset of all topics which is much smaller than the whole topic set. All the other topics possess no relevance with this URL.

For instance, topic 1 includes term 1, term 2, term 3, ... term k. Topic 2 includes terms 1 and term 5. Topic 3 includes term 2. By inverting the topic feature vector, the one or more computing systems 102 obtains a term-topic mapping table: term 1 maps to topic 1 and topic 2, term 2 maps to topic 1 and topic 3, term 3 maps to topic 1, term 5 maps to topic 2, ..., term k maps to topic 1.

For instance, a URL n in the gathered data 108 represents data includes term 3 and term 5. Based on the exemplary term-topic mapping above, the one or more computing system 102 obtains that the term 3 maps to topic 1 and term 5 maps to topic 2. Thus the one or more computing system 102 compares the URL n with the topic 1 and the topic 2 without comparing it with the topic 3.

At 706, the one or more computing systems 102 select optimal data from the gathered data 108 to match the user information needs based on the budget distribution.

For example, the one or more computing systems 102 may use an exemplary greedy algorithm to select the optimal webpages to match the user information needs.

---

Algorithm 2
Greedy algorithm for index selection

---

Input: the topic-URL relevance table T,
    the topic distribution P$_{new}$ (t$_k$|X),
    The total index size needed from the entire web N;
Output: the set of each topic's URLs for index Index_Set;
Initialization:
for each topic t$_i \in$ T do
    sort the URL entries based on similarity to t$_i$ in descending order;
Iterative Algorithm:
While(SizeOf (Index_Set) < N)
{
 1: N' = N − sizeof(Index_Set);
 2: if N' < threshold
 3:    break;
 4: for each topic t$_i \in$ T do
 5:    tmp_URL_count = 0;
 6:    for each entry URL$_j$ of t$_i$ do
 7:        add URL$_j$ to t$_i$ in Index_Set;
 8:        Tag URL$_j$ to t$_i$ as selected;
 9:        tmp_URL_count++;
10:       if tmp_URL_count ≥ P$_{new}$(t$_k$|X) × N' then
11:         break;
12: De-duplicate the URLs in Index_Set;
}

---

In the example of Algorithm 2, the greedy algorithm presented above, describes the process of selecting the optimal data such as webpages to maximum match the user information needs. Basically the selection is to select the top relevant document in each topics, however, there is a challenge of collisions among topics when doing the selection. For example, URL1 could not only belong to topic $c_i$'s top relevant URLs but also belong to topic $c_j$'s top relevant URLs. One document might be selected for multiple times. So in order to maximum match the topic distribution, the exemplary algorithm is designed as an iterative process may be used. The one or more computing systems 102 need to sort the URL sets for each topic based on the relevance in the initialization process. Then in one iteration, the one or more computing systems 102 first need to compute the selecting target of the current round: N'=N sizeof(Index_Set), which is the gap between expected index size and selected index size. After that the one or more computing 102 only needs to scan the topic-URL relevance table by topic, and select another few of top relevant URLs other than the selected URLs in each topic to its bucket until reach to the topic's index budget of this round: P$_{new}$(t$_k$|X)×N'. After the iteration, the one or more computing systems 102 compute the currently obtained index by removing the duplicated selecting due to topic collision again. The exemplary algorithm will complete until the gap is small enough. In one example, the threshold is set to 1 percent of expected index size or even smaller. After this greedy process, the one or more computing systems 102 can get the optimal index set containing URLs which is maximally matched with the user information needs.

An Exemplary Computing System

Figure 8:
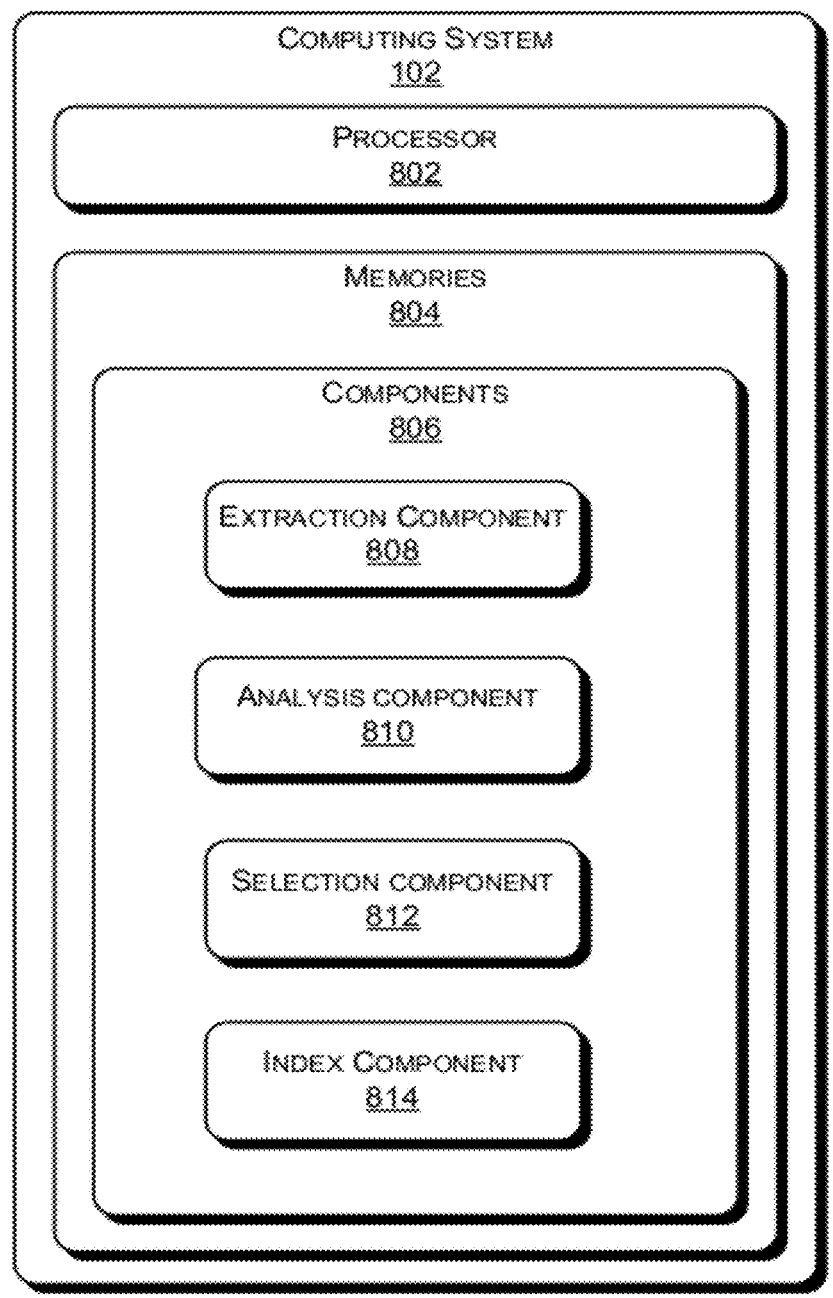

FIG. 8 illustrates an exemplary embodiment of one of the one or more computing system 102, which can be used to implement the techniques described herein, and which may be representative, in whole or in part, of elements described herein.

Computing system 102 may, but need not, be used to implement the techniques described herein. Computing system 102 is only one example and is not intended to suggest any limitation as to the scope of use or functionality of the computer and network architectures.

The components of computing system 102 include one or more processors 802, and one or more memories 804.

Generally, memories 804 contain computer executable instructions that are accessible and executable by processor 802.

Memories 804 are examples of computer-readable media. Computer-readable media includes at least two types of computer-readable media, namely computer storage media and communications media. The data storage devices 110 and 114 are also examples of computer-readable media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Any number of program modules, applications, or components 806 can be stored in the memory, including by way of example, an operating system, one or more applications, other program modules, program data, computer executable instructions. The components 806 may include an extraction component 808, an analysis component 810, a selection component 812, and an index component 814.

The extraction component 808 gathers data from one or more locations 106.

The analysis component 810 determines user information needs 116 from one or more sources 118. In an event that the one or more sources 118 are search log data 120, the analysis component 508 groups similar queries into a topic, generates a topic cluster at least partly based on a result of grouping similar queries; generates an index budget for the topic cluster, and generates a term based feature vector of the topic. In an event that the one or more sources 118 are website contents 122, the analysis component 810 finds terms with high frequency appearing in the website contents of the website, and groups similar terms into a topic. In an event that the one or more sources 118 includes other sources 124 such as an online directory, the analysis component 810 uses topics extracted from the online directory as a reference to ensure the user information needs 116 cover a wide range of topics;

The selection component 812 selects a subset of data from the data at least partly based on the user information needs.

The index component 814 indexes the selected data.

For the sake of convenient description, the above system is functionally divided into various modules which are separately described. When implementing the disclosed system, the functions of various modules may be implemented in one or more instances of software and/or hardware.

The computing system may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

In the distributed computing environment, a task is executed by remote processing devices which are connected through a communication network. In distributed computing environment, the modules may be located in storage media (which include data storage devices) of local and remote computers. For example, some or all of the above modules such as the extraction component 808, the analysis component 810, the selection component 812, and the index component 814 may locate at one or different memories 804.

Some modules may be separate system and their processing results can be used by the computing system 102. For example, the extraction component 508 can be an independent machine.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method performed by one or more processors configured with computer-executable instructions, the method comprising:
    gathering data from multiple sources, the multiple sources including search log data of a search engine and website content from an online forum website or a social network website;
    predicting, based on the multiple sources, topics of interest to one or more users;
    generating, based on the topics of interest, a set of topic-based representations from the multiple sources;
    generating budgets for the set of topic-based representations at least partly based on a degree of user interest that is calculated differently dependent upon a respective source of a respective topic-based representation, the budgets including a first quota of data to be selected for a first topic-based representation from the search log data and a second quota of data to be selected for a second topic-based representation from the website content, the generating includes:
        calculating a first degree of user interest for the first topic-based representation based on a number of unique uniform resource locators ("URLs") that are related to the first topic-based representation and clicked in the search log data; and calculating a second degree of user interest for the second topic-based representation based on a frequency a topic related to the second topic-based representation that appears in the website content and a publishing date of a webpage that is in the website content and contains the topic; and smoothing a data budget distribution among the set of topic-based representations, the smoothing including allocating a portion of the first quota of data from the first topic-based representation to the second quota for data for the second topic-based representation, the first topic-based representation having a higher ranking than the second topic-based representation at least partly based on the topics of interest.

2. The method as recited in claim 1, wherein each of the topic-based representations includes a set of terms.

3. The method as recited in claim 1, wherein:
the search log data includes one or more of information of users, queries submitted by users to the search engine, URLs associated with the queries, and a correlation between the users, the queries, and the URLs.

4. The method as recited in claim 3, wherein the URLs comprise:
returned URLs that are returned by the search engine corresponding to the queries; and
clicked URLs that are clicked by the users from the returned URLs.

5. The method as recited in claim 1, further comprising:
selecting a subset of the data at least partly based on the smoothed budget distribution; and
storing the subset of the data at the one or more data storage devices.

6. The method as recited in claim 5, further comprising indexing the subset of data.

7. A method performed by one or more processors configured with computer-executable instructions, the method comprising:
determining a prediction of-user information needs that predict topics of interests at least partly according to information from search log data, the search log data includes information of users, queries submitted by the users, uniform resource locators ("URLs") associated with the queries, and a correlation between the users, queries, and the URLs, the determining including grouping similar queries submitted by the users into a topic;
calculating a diversity degree of a respective user information need of the user information needs based on a number of unique URLs that are related to the respective user information need and clicked in the search log data;
generating a budget for the respective user information need at least partly based on a degree of user interest and a diversity degree of the respective user information need;
selecting data at least partly based on the user information needs, the selecting including:
smoothing a data budget distribution among the user information needs to generate a smoothed budget distribution, the smoothing including allocating a portion of a quota of data from a first topic-based representation representing a first user information need to a second topic-based representation representing a second user information need, the first topic-based representation having a higher ranking than the second topic-based representation;
computing a relevancy between the first user information need in the user information needs and data represented by the URLs; and
selecting one or more URLs from the URLs to match the first user information need based on the smoothed data budget distribution; and
storing the data represented by the one or more URLs at one or more data storage devices.

8. The method as recited in claim 7, wherein the search log data comprises data of a search log of a search engine.

9. The method as recited in claim 8, wherein the URLs comprise:
returned URLs that are returned by the search engine corresponding to the queries; and
clicked URLs that are clicked by the users from the returned URLs.

10. The method as recited in claim 7, wherein the determining the prediction of user information needs at least partly from search log data further includes:
generating a topic cluster at least partly based on a result of grouping similar queries.

11. The method as recited in claim 7, further comprising:
calculating the degree of user interest of the respective user information need by calculating a number of queries related to the respective user information need that are submitted by the users.

12. The method as recited in claim 7, wherein the user information needs are represented by topic clusters, and wherein the computing the relevancy between the respective user information needs and data represented by the URLs comprises:
computing the relevancy between the data and the topic clusters that share one or more identical terms extracted from the queries.

13. The method as recited in claim 7, further comprising indexing the data.

14. A computer-implemented system for index selection based on user information needs, the computer-implemented system comprising:
one or more memories having stored therein computer-executable instructions; and
a processor configured to execute the computer-executable instructions to performs acts comprising:
gathering data from one or more locations, the data including a document or an identification of the document, the one or more locations including a network;
determining a prediction of the user information needs that predict topics of interests from multiple sources, the multiple sources including search log data, the search log data including information of users, queries submitted by the users to a search engine, and identifications of data returned by the search engine in response to the queries and website contents from an online forum website or a social network website, the determining including extracting popular topics from the website contents by analyzing terms in the website contents;
assigning a first total budget to first multiple user information needs determined from the search log data and a second total budget to second multiple user information needs determined from the website contents;
calculating a first budget within the first total budget for a first predicted user information need determined from the search log data based on topics of interests in the search log data, the calculating including:
- grouping one or more queries that represent a topic;
- generating multiple topic clusters at least partly based on a result of the grouping;
- ranking the multiple topic clusters based on topics of interests related to the multiple topic clusters; and
- generating the first budget for the first predicted user information need at least partly based on the ranking of a topic cluster related to the first predicted user information need;

assigning a second budget within the second total budget to a second predicted user information need determined from the website contents;

determining that both the first predicted user information need determined from the search log data and the second predicted user information need determined from the website contents represent the topic in response to determining that the first predicted user information need and the second predicted user information need share multiple common terms;

selecting one of the first predicted user information need or the second predicted user information need to keep;

increasing the first budget or the second budget corresponding to the one of the first predicted user information need or the second predicted user information need that is selected to be kept;

selecting a subset of data from the data at least partly based on the one of the first predicted user information need or the second predicted user information need that is selected to be kept; and indexing the subset of data.

15. The computer-implemented system as recited in claim 14, wherein:
- the one or more queries are similar; and
- the acts further comprise:
- generating a term-based feature vector for each of the multiple topic clusters.

16. The computer-implemented system as recited in claim 14, wherein
the website contents include information from an online forum website or a social network website.

17. The computer-implemented system as recited in claim 14, wherein:
- the multiple sources further include a third source from an online directory; and
- the acts further comprise:
- in response to determining that a source is the third source from the online directory,
- using topics extracted from the online directory as a reference to ensure that the user information needs cover a wide range of topics.

18. The computer-implemented system as recited in claim 14, wherein the acts further comprise smoothing a budget distribution among the user information needs.

19. The computer-implemented system as recited in claim 14, wherein the acts further comprise extracting the particular topic from the website contents.

* * * * *